United States Patent [19]

Inaba et al.

[11] Patent Number: 5,002,708
[45] Date of Patent: Mar. 26, 1991

[54] DRIVE SYSTEM ABNORMALITY DETECTING METHOD AND APPARATUS OF AN INJECTION-MOLDING MACHINE

[75] Inventors: Yoshiharu Inaba, Kawasaki; Masao Kamiguchi, Oshino, both of Japan

[73] Assignee: Fanuc Ltd., Minamitsuru, Japan

[21] Appl. No.: 363,514

[22] PCT Filed: Nov. 24, 1988

[86] PCT No.: PCT/JP88/01185
§ 371 Date: May 30, 1989
§ 102(e) Date: May 30, 1989

[87] PCT Pub. No.: WO89/06187
PCT Pub. Date: Jul. 13, 1989

[30] Foreign Application Priority Data

Dec. 25, 1987 [JP] Japan ............................. 62-327516

[51] Int. Cl.⁵ ............................................. B29C 45/77
[52] U.S. Cl. .................................. 264/40.1; 425/136; 425/145; 425/170
[58] Field of Search ................... 264/40.1, 40.5, 328.1; 425/135, 136, 145, 149, 151, 161, 170

[56] References Cited

U.S. PATENT DOCUMENTS 4,851,171 7/1989 Shimizu et al. .................... 425/135

*Primary Examiner*—Jill L. Heitbrink
*Attorney, Agent, or Firm*—Staas & Halsey

[57] ABSTRACT

A drive system abnormality detecting apparatus of an injection-molding machine includes a microprocessor (19) for a controller, which causes a display unit (24) to indicate the occurrence of an abnormal situation. The drive of a servomotor (5) for an injection is stopped when the microprocessor concludes that the difference between the driving current of the servomotor and the output of a force detector, indicative of the resin pressure inside a cylinder (2), is not within predetermined permissible limits. The motor driving current and the detector output are individually periodically detected, during the time interval between the start of injection to the end of metering. By doing th is, the microprocessor prevents production of defective moldings, attributable to the occurrence of an abnormal situation in a screw drive system, and damage to components of the screw drive system and dies.

6 Claims, 2 Drawing Sheets

DRIVE SYSTEM ABNORMALITY DETECTING METHOD AND APPARATUS OF AN INJECTION-MOLDING MACHINE

BACKGROUND OF THE INVENTION

1. Technical Field

The present invention relates to a drive system abnormality detecting apparatus of an injection-molding machine for detecting an abnormal situation of resin pressure detecting means or screw drive means for axially driving a screw of the injection-molding machine.

2. Background Art

In order to make a resin pressure, e.g., the resin pressure inside a cylinder equal to a set resin pressure, in an injection-molding machine, the resin pressure inside the cylinder is indirectly measured by means of resin pressure detecting means which is disposed at the rear end of a screw. The measured resin pressure is compared with a screw injection pressure set by means of injection pressure setting means. If the resin pressure inside the cylinder is lower than the set screw injection pressure, the screw is driven in the direction to raise the resin pressure inside the cylinder. If the the resin pressure inside the cylinder is higher than the set screw injection pressure, on the other hand, the screw is driven in the direction to lower the resin pressure inside the cylinder. Thus, closed loop drive control is effected.

According to the prior art described above, proper closed-loop control can be accomplished if both the resin pressure detecting means and the screw drive means are in the normal state. If either the resin pressure detecting means of the screw drive means malfunctions, however, proper closed-loop control cannot be achieved.

If the resin pressure detecting means becomes out of order, thus becoming unable to measure the resin pressure inside the cylinder, for example, it is impossible to keep the resin pressure inside the cylinder at the set resin pressure, and the repetition accuracy of pressure control for the molding operation is considerably lowered, thereby inducing the occurrence of defective molding. Moreover, if the screw drive means (hereinafter referred to as injection drive means) for axially driving the screw is compulsorily driven in the direction to raise the resin pressure inside the cylinder, on the basis of a measured value given by the resin pressure detecting means in trouble, the injection drive means is subjected to overload, so that the screw, drive system, dies, etc. are adversely affected. In addition, the resin pressure inside the cylinder increases extraordinarily, thereby creating a very dangerous situation.

In case of trouble in the injection drive means, moreover, the drive means cannot properly respond to feedback input despite the normality thereof. Thus, the same problems as aforesaid are caused.

SUMMARY OF THE INVENTION

The object for the present invention is to provide a drive system abnormality detecting apparatus of an injection-molding machine, capable of detecting an abnormal situation of resin pressure detecting means or injection drive means without delay.

In order to achieve the above-mentioned object, the present invention comprises: resin pressure detecting means for detecting a resin pressure; driving force detecting means for detecting a driving force of screw drive means for driving a screw in an axial direction of the screw; and abnormality detecting means operable to compare values detected by the resin pressure detecting means and the driving force detecting means, and to detect an occurrence of an abnoraml situation when the difference between the compared values exceeds predetermined permissible limits.

According to the present invention, since an abnormal situation caused in the resin pressure detecting means or the injection axis drive means can be automatically detected, lowering of the repetition accuracy of the pressure control can be positively prevented, so that risks such as defective molding, involved in unattended operation of the injection-molding machine, are greatly reduced to ensure reasonable molding operation. Moreover, since incomplete pressure control cannot be caused by the abnormal situation of the resin pressure detecting means or the screw drive means, a screw, drive system, dies, etc. cannot be damaged by extraordinary load, and resin cannot be subjected to extraordinary pressure, thus ensuring further improved safety of the molding operation.

DETAILED DESCRIPTION OF THE PREFERRED EMBODIMENT

Figure 1:
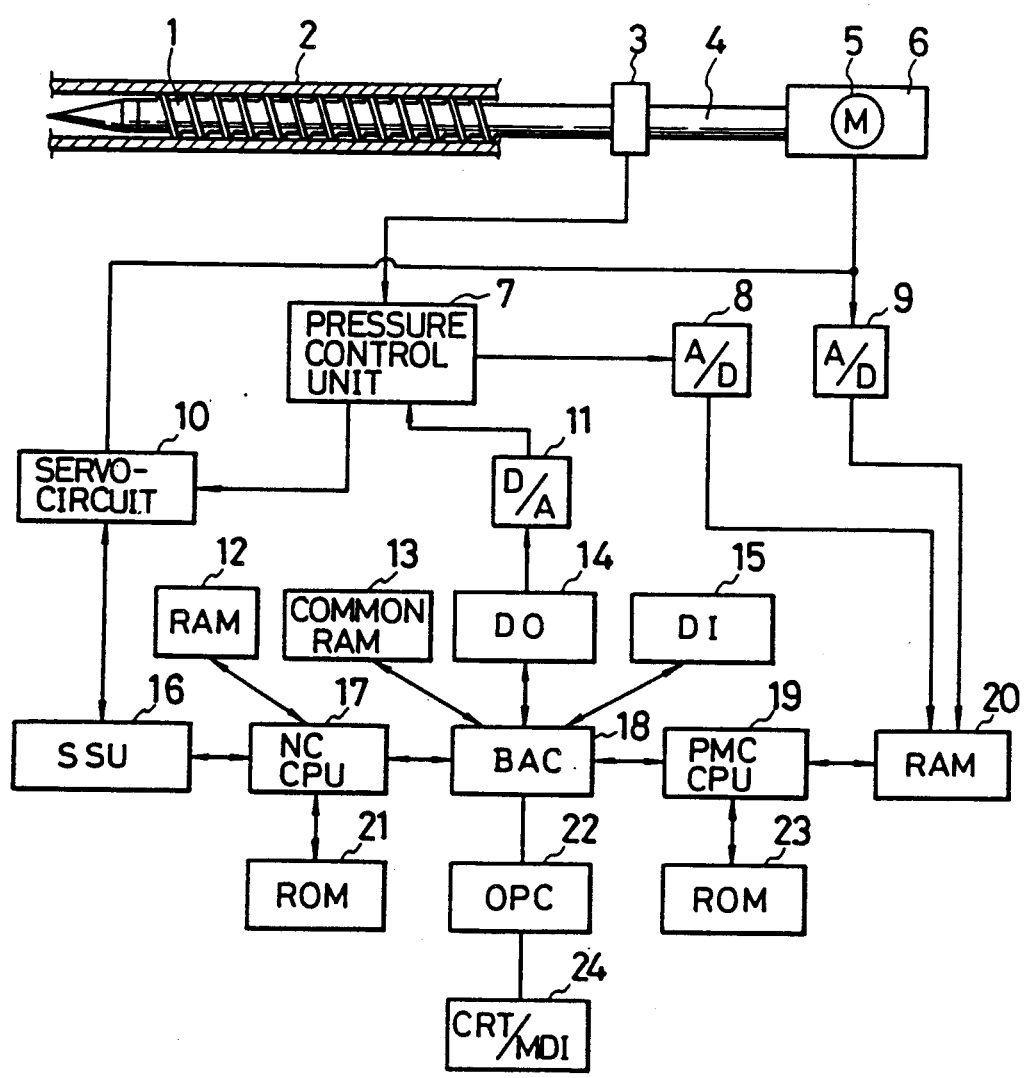
FIG. 1 is a block diagram showing the principal part of an injection-molding machine mounted with a drive system abnormality detecting apparatus according to an embodiment of the present invention.

In an injection-molding machine of FIG. 1, a rotary motion of a servomotor 5 for an injection axis, for use as screw driving means, is converted into a rectilinear motion of an injection drive shaft 4 by means of a transmission device 6, and a screw 1 disposed in a heating cylinder 2 is caused to perform injecting operation by means of the drive shaft 4.

Numeral 3 denotes a force detector for use as resin pressure detecting means which is disposed between the screw 1 and the injection drive shaft 4, and serves to indirectly measure the resin pressure inside the cylinder by detecting an axial pressure acting on the screw 1.

Numeral 17 denotes a microprocessor (hereinafter referred to as CPU) for NC, and numeral 19 denotes a CPU for a programmable controller (hereinafter referred to as PMC). The PMCCPU 19 is connected with a ROM 23 which stores a sequence program for controlling the sequence operation of the injection-molding machine, etc. The PMCCPU 19 is also connected with a RAM 20 which temporarily stores a value indicative of the resin pressure inside the cylinder, delivered from the force detector 3 through a pressure control unit 7 and digitized by means of an A/D converter 8, and a driving current value delivered from a servo-circuit 10 to drive the servomotor 5 and digitized by means of an A/D converter 9, that is, a value indirectly indicative of a screw injection pressure. Moreover, the NCCPU 17 is connected with a ROM 21 which stores a control program for generally controlling the injection-molding machine, and a RAM 12 for temporarily storing data. The NCCPU 17 is also connected, through a servo-interface 16, with the servo-circuit 10 which controls the drive of the servomotor for each of various axes, such as the injection axis, mold clamp axis, screw rotating axis, ejector axis, etc. FIG. 1 shows only the servomotor 5 for the injection axis, among other servomotors.

Numeral 13 denotes a nonvolatile common RAM 13 which, composed of a bubble memory of CMOS memory, includes a memory section for storing an NC program for controlling various operations of the injection-molding machine and other programs, and another memory section for various set values and macro-variables. Numeral 18 denotes a bus arbiter controller (hereinafter referred to as BAC), which is bus-connected with the NCCPU 17, the PMCCPU 19, the common RAM 13, an input circuit 15, and an output circuit 14. Buses used are controlled by means of the BAC 18. Further, the BAC 18 is connected, through an operator control panel (hereinafter referred to as OPC) 22, with a manual data input device (hereinafter referred to as CRT/MDI) 24 with a display unit for inputting the screw injection pressure and various other data. The pressure control unit 7 receives a command, which is obtained by converting a command pressure given by the output circuit 14 into an analog signal by means of a D/A converter 11, and compares the command pressure with the pressure detected by means of the force detector 3. The difference between these pressures is delivered to the servo-circuit 10, and a torque command value delivered from the servo-circuit 10 to the servomotor 5 for the injection axis, is clamped to effect torque limiting operation.

In the arrangement described above, the injection-molding machine performs a molding operation, based on the sequence control by the PMCCPU 19 and the control of various operations by the NCCPU 17.

Figure 2:
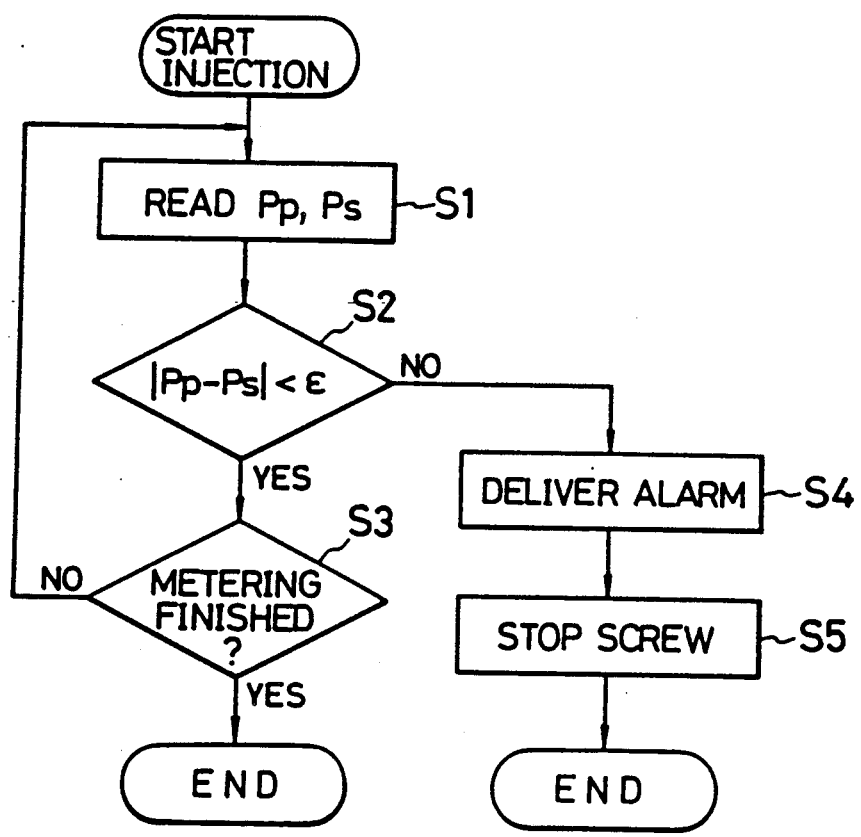
FIG. 2 is a flow chart illustrating processes of abnormality detection executed by means of the apparatus of FIG. 1.

Referring now to FIG. 2, there will be described the operation of the injection-molding machine according to this embodiment, including abnormality detection executed by the PMCCPU 19 at intervals of a predetermined period, during processes from the start of injection to the end of metering.

When the injection is started, a programmed injection pressure (maximum pressure is outputted if there is no injection pressure command at the time of injection) is delivered from the PMCCPU 19 to the pressure control unit 7, through the BAC 18, output circuit 14, and D/A converter 11, and is compared with the pressure detected by means of the force detector 3. In accordance with the difference between these pressures, torque limit means in the servo-circuit 10 performs the torque limiting operation.

Meanwhile, the NCCPU 17 starts pulse distribution to the servo-circuit 10 for the injection axis through the servo-interface 16, in accordance with an injection start command, to drive the servomotor 5 for the injection axis. When a pressure hold process is started after the injection process is finished, a command pressure for each pressure hold step is delivered to the pressure control unit 7 in the same manner as aforesaid. In accordance with the difference between the command pressure and the pressure detected by means of the force detector 3, the torque limit means in the servo-circuit 10 performs a torque limit operation. Thus, hold pressure control is achieved so that the command pressure and the detected pressure are equal.

In the meantime, the pressure detected by means of the force detector 3 is supplied to the A/D converter 8 through the pressure control unit 7. A detected pressure Pp, a digital signal obtained as a result of the conversion by means of the converter 8, is written in the RAM 20 at intervals of a predetermined sampling period. Also, a driving current value Ps of the servomotor 5 for the injection axis is converted by means of the A/D converter 9, and is written in the RAM 20 in synchronism with the sampling period of the pressure Pp.

During the time interval between the start of injection and the end of metering, the PMCCPU 19 performs abnormality detection shown in FIG. 2 at intervals of a predetermined period.

First, the value Pp, indicative of the resin pressure inside the cylinder detected by means of the force detector 3, and the value Ps, indicative of the driving current value of the servomotor 5 or indirectly indicative of the screw injection pressure, are read out from the RAM 20 (step S1). Then, the difference between the value Pp indicative of the resin pressure inside the cylinder and the value Ps indicative of the screw injection pressure is obtained, and whether this difference is within predetermined permissible limit $\epsilon$ is determined (step S2). If the difference between the resin pressure Pp inside the cylinder and the screw injection pressure Ps is within the predetermined permissible limits $\epsilon$, the force detector 3 and the servomotor 5 are regarded as normal, and the program proceeds to step S3. Thereupon, whether a metering end signal is already inputted, that is, whether the cycle processes from the start of injection to the end of metering are finished, is determined. If the metering is not finished, the program returns to step S1, whereupon a monitor loop consisting of steps S1, S2, and S3 is executed to continue monitoring the resin pressure Pp inside the cylinder and the screw injection pressure Ps.

Meanwhile, if either the force detector 3 or the servomotor 5 for the injection axis, for use as the screw drive means, malfunctions so that the force detector 3 cannot normally detect the resin pressure inside the cylinder or that abnormal current flows through the servomotor 5, during the execution of the monitor loop, the difference between the resin pressure Pp inside the cylinder and the screw injection pressure Ps, which should be substantially equal, increases and exceeds the predetermined permissible limit $\epsilon$. This situation is detected in step S2. In this case, the program for the operation of the PMCCPU 19 proceeds to step S4, whereupon the CPU 19 delivers an alarm to the CRT/MDI 24 through the BAC 18 and the OPC 22. Thus, the CRT/MDI 24 makes an abnormality indication, thereby warning the operator that the force detector 3 or the servomotor 5 is out of order. Further, the drive output of the servomotor 5 is stopped, thereby preventing an accident wherein the resin pressure inside the cylinder increases extraordinarily (step S5).

In this embodiment, the force detector 3, which is disposed between the screw 1 and the injection drive shaft 4, and adapted to detect the resin pressure acting in the axial direction of the screw 1, thereby indirectly measuring the resin pressure inside the cylinder, is used as the resin pressure detecting means for detecting the resin pressure. However, the detecting means may be of any construction, provided it can detect the resin pressure, whether directly or indirectly. For example, a presure sensor inside the cylinder 2 may be used for this purpose. In the aforementioned embodiment, moreover, the output of the force detector 3 and the driving current of the servomotor 5 for the injection axis are converted into digital signals for comparison. Alternatively, however, the difference between the output of the force detector 3 and the driving current of the servomotor 5 for the injection axis may be detected by means of a differential amplifier or the like so that an abnormality detection signal is outputted to indicate the occurrence of an abnormal situation when the difference exceeds a predetermined level.

What is claimed is:

1. A method for detecting a malfunction in operation of an injection-molding machine having a driver for a screw, comprising the steps of:

detecting a resin pressure in the injection-molding machine and generating a first pressure value;

detecting a driving force of the driver for driving the screw in the axial direction of the screw, and generating a second pressure value; and comparing the first and second pressure values, and detecting a malfunction in the injection-molding machine when a difference between the compared first and second pressure values exceeds a predetermined value.

2. A drive system abnormality detecting apparatus of an injection-molding machine having screw drive means for driving a screw in an axial direction of the screw, comprising:

resin pressure detecting means for detecting a resin pressure in said injection-molding machine and providing a first pressure value;

driving force detecting means for detecting a driving force of the screw drive means for driving the screw in the axial direction of the screw and for providing a second pressure value; and abnormality detecting means for comparing the first pressure value provided by said resin pressure detecting means and the second pressure value provided by said driving force detecting means, and for detecting an occurrence of an abnormal situation when a difference between the compared first and second pressure values exceeds predetermined permissible limits.

3. A drive system abnormality detecting apparatus of an injection-molding machine according to claim 2, wherein the screw drive means has a servomotor as a drive source therefor, and wherein said driving force detecting means is operable to detect a driving current value of said servomotor which is indicative of the driving force of the screw drive means.

4. A drive system abnormality detecting apparatus of an injection-molding machine according to claim 2, wherein the injection-molding machine includes a cylinder accommodating the screw therein, and wherein said resin pressure detecting means is operable to detect the resin pressure inside the cylinder.

5. A drive system abnormality detecting apparatus of an injection-molding machine according to claim 3, wherein the injection-molding machine includes a cylinder accommodating the screw therein, and wherein said resin pressure detecting means is operable to detect the resin pressure inside the cylinder.

6. A drive system abnormality detecting apparatus for an injection-molding machine having a drive for a screw, comprising:

a pressure detector for detecting axial pressure acting on the screw and for generating a first pressure value;

a driving force detector for detecting a driving force of the screw in the axial direction and for providing a second pressure value; and means, coupled to said pressure detector and said driving force detector, for comparing the first and second pressure values, and for detecting a malfunction in operation of the injection-molding machine when a difference between the compared first and second pressure values exceeds a predetermined value.

* * * * *